E. FORREST.
SLEIGH ATTACHMENT FOR AUTOMOBILES.
APPLICATION FILED JUNE 22, 1915.

1,207,891.

Patented Dec. 12, 1916.

Inventor
E. Forrest,
By Victor J. Evans
Attorney

UNITED STATES PATENT OFFICE.

EUGENE FORREST, OF BRIMLEY, MICHIGAN, ASSIGNOR OF TWO-EIGHTHS TO TREFFLEY FORREST, ONE-EIGHTH TO CARL FORREST, AND ONE-EIGHTH TO ALFRED FORREST, SR., ALL OF BRIMLEY, MICHIGAN.

SLEIGH ATTACHMENT FOR AUTOMOBILES.

1,207,891.      Specification of Letters Patent.      Patented Dec. 12, 1916.

Application filed June 22, 1915. Serial No. 35,634.

*To all whom it may concern:*

Be it known that I, EUGENE FORREST, a citizen of the United States, residing at Brimley, in the county of Chippewa and State of Michigan, have invented new and useful Improvements in Sleigh Attachments for Automobiles, of which the following is a specification.

This invention relates to sleigh attachments for automobiles and similar vehicles, the object in view being to provide front runners adapted to be attached to an automobile after removing the wheels thereof, together with novel means for yieldingly holding the front runners in a normally horizontal position while permitting them to rock in a fore and aft direction. The ordinary steering mechanism of the automobile is made use of for the purpose of steering the machine when supported by the runners.

With the above and other objects in view, the invention consists in the novel construction, combination and arrangement of parts, as herein described, illustrated and claimed.

Figure 1:
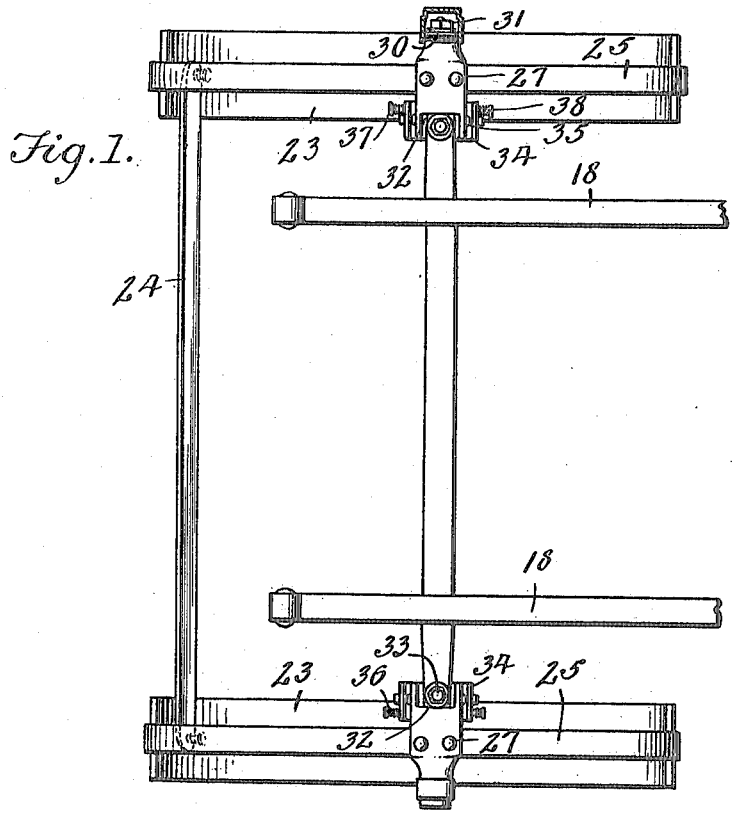
Figure 2:
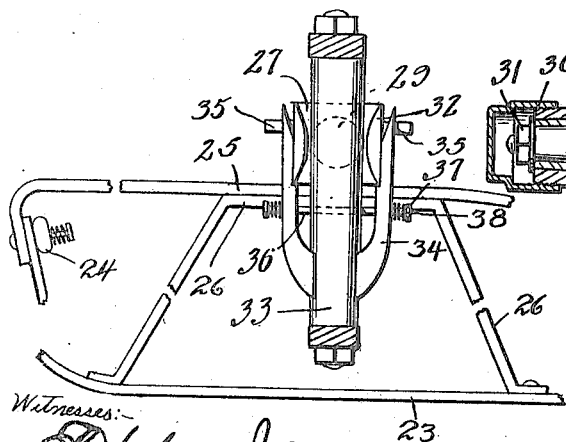
Figure 3:
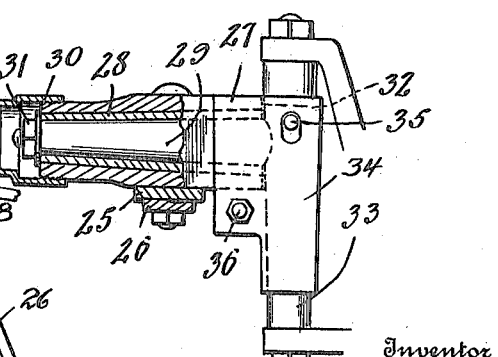

In the accompanying drawings: Figure 1 is a plan view of the front runners. Fig. 2 is a detail vertical section showing the knuckle engaging jaws. Fig. 3 is a detail section through one of the spindle boxes of the front runners.

The front runners 23 have their front and rear ends upturned and are connected at their forward extremities by means of a yoke bar 24. Each of the front runners, in the preferred embodiment of the invention, is provided with a top run 25 braced in relation to the runner by means of a knee 26 the central or highest portion of which is connected to the top run 25 directly under a spindle box 27. The bore of the spindle box 27 is of sufficient diameter to receive a bushing 28 which in turn receives the spindle 29 of one of the steering knuckles of the automobile, a washer 30 and a nut 31 serving to retain the spindle 29 in the box 27. The inner end of the box 27 is formed with fork arms 32 having upwardly and downwardly diverging portions to admit of a relative rocking movement between the runner and the vertical member 33 of the steering knuckle which occupies the space between the fork arms 32. This allows the runner to rock in a fore and aft direction upon the spindle 29 to conform to the road surface. Connected to the spindle box 27 are oppositely arranged knuckle clamping jaws 34, said jaws being hung on pins 35 projecting from the fork arms 32 so that the free extremities of said jaws may move in a fore and aft direction. The free extremities of said jaws are concaved to partially embrace opposite sides of the member 33 of the knuckle and are held firmly in engagement therewith by means of a bolt 36 which passes through openings in the jaws 34 and is provided with heads 37 at the opposite extremities thereof, coiled expansion springs 38 being arranged to bear against the outer faces of the jaws 34, the outer extremities of said springs being held by the heads at the opposite extremities of the bolt.

The construction just described permits the jaws 34 to rock in order to admit of the fore and aft rocking movement of the runner, the springs serving in conjunction with the jaws 34 to hold the runner normally in a substantially horizontal position.

From the foregoing description, taken in connection with the accompanying drawings, it will be understood that the runners have a fore and aft rocking movement so as to accommodate themselves to inequalities in the road surface; that the runners being attached to the steering knuckles, are controlled by the ordinary steering mechanism of the automobile; that while the runners are carried by the steering knuckles, they are permitted to rock in a fore and aft direction without undue strain on said steering knuckles.

What I claim is:

1. In a sleigh attachment for automobiles, the combination with a steering knuckle, of a spindle box having a runner attached thereto, and jaws yieldingly engaging the steering knuckle and spindle box, whereby the runner is normally sustained in a horizontal position.

2. In a sleigh attachment for automobiles, the combination with a steering knuckle, of a spindle box having a runner attached thereto, jaws yieldingly engaging the steering knuckle and spindle box, whereby the runner is normally sustained in a horizontal position, a bolt extending through said jaws, and springs on said bolt serving to press the jaws against the knuckle and spindle box.

In testimony whereof I affix my signature in presence of two witnesses.

EUGENE FORREST.

Witnesses:
WM. W. BYERS,
CARL FORREST.

Copies of this patent may be obtained for five cents each, by addressing the "Commissioner of Patents, Washington, D. C."